March 6, 1956
L. A. PHILIPP
2,737,146
HEATING ELEMENT CONTROL POSITION
INDICATOR FOR ELECTRIC RANGE
Filed Oct. 16, 1951
3 Sheets-Sheet 3
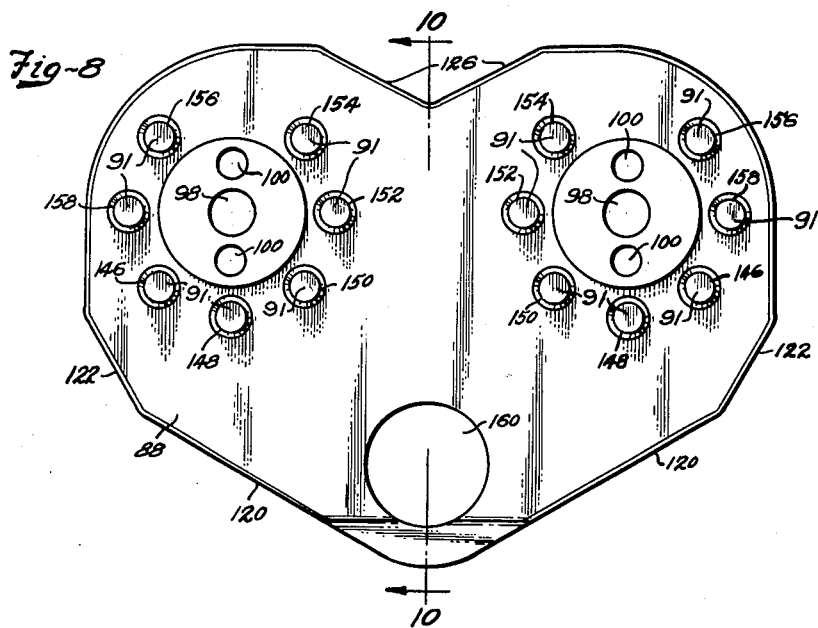
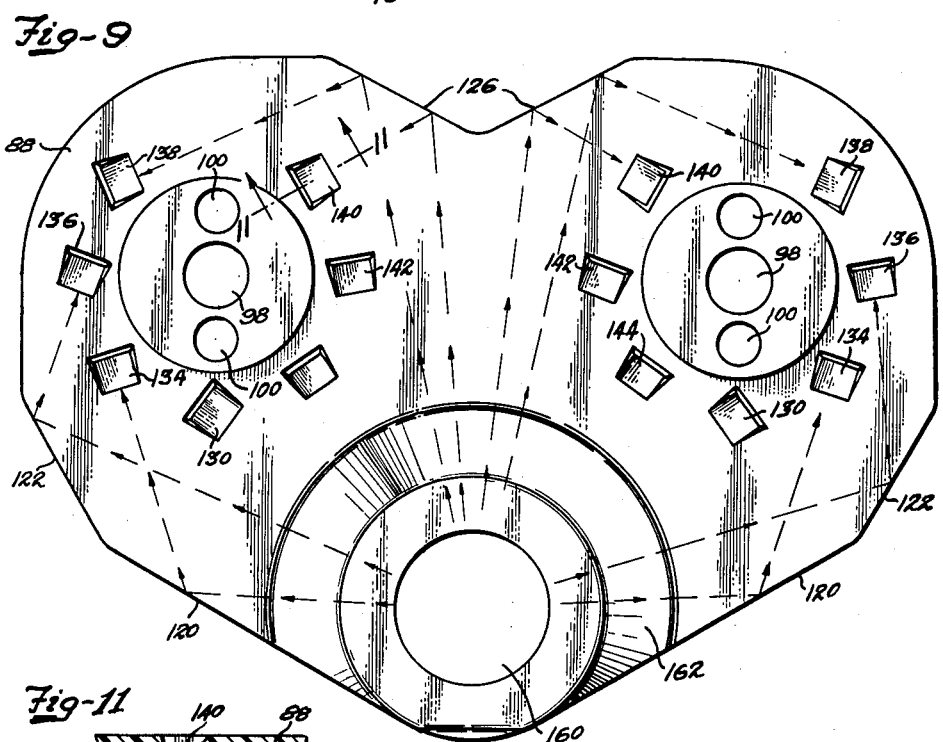
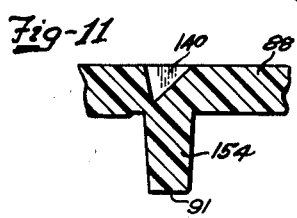
INVENTOR.
LAWRENCE A. PHILIPP
BY
Ralph E. Baker
ATTORNEY

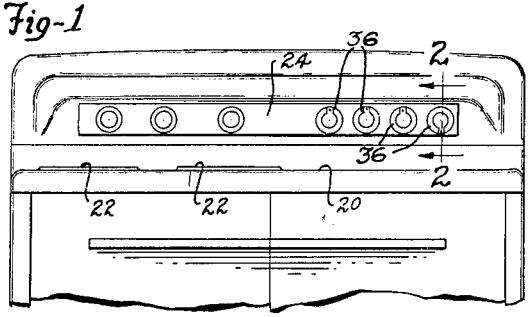
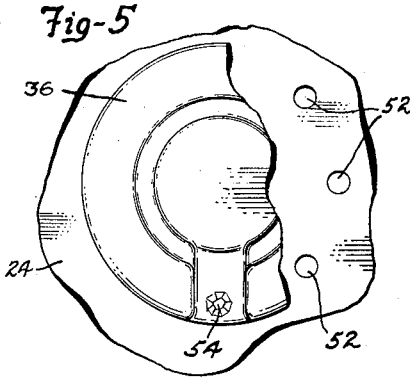
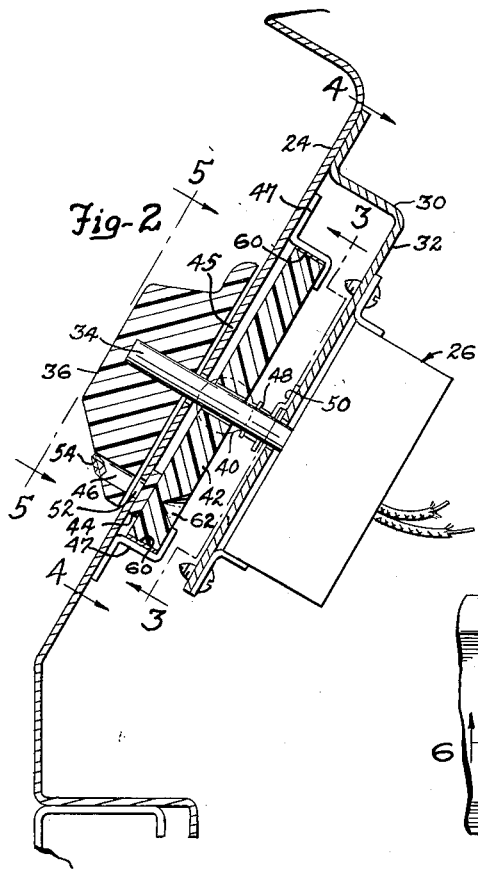
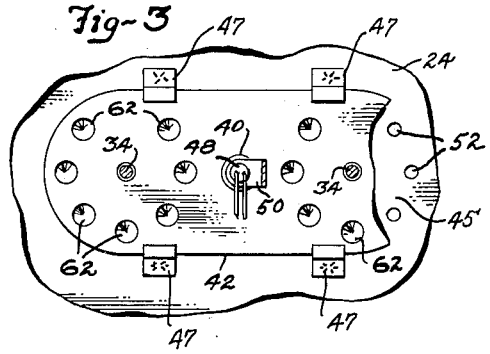
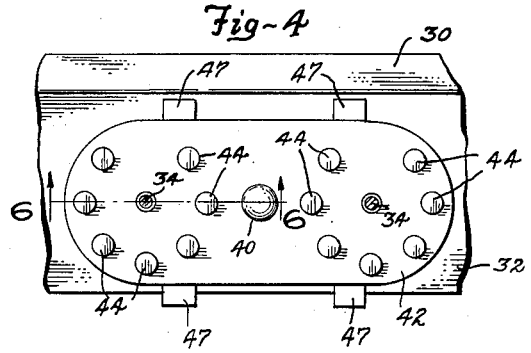
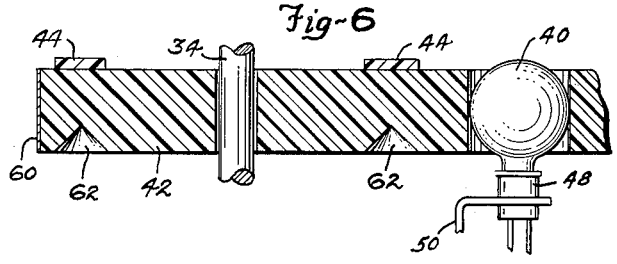
INVENTOR.
LAWRENCE A. PHILIPP
BY
Ralph E. Baker
ATTORNEY

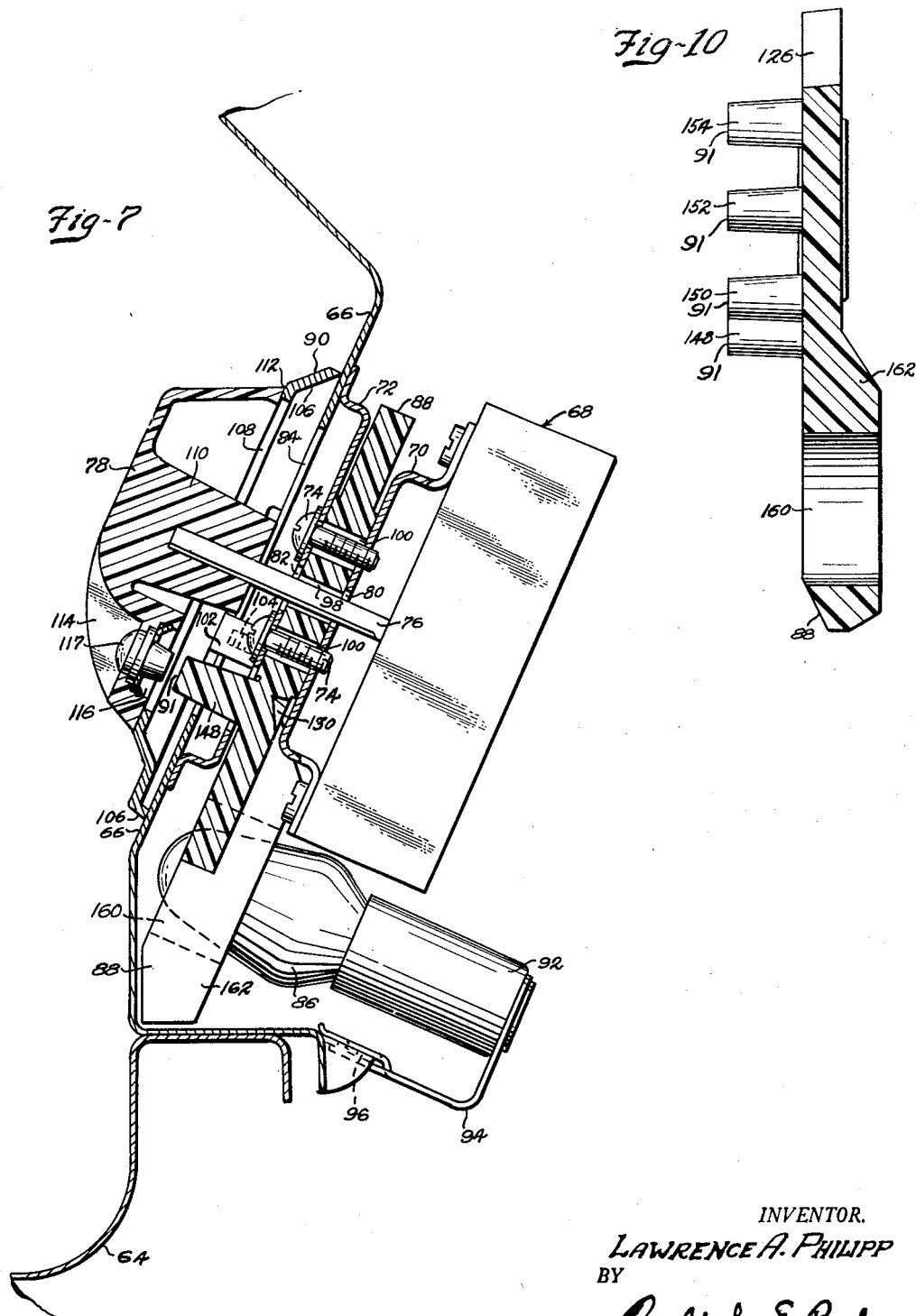

United States Patent Office 2,737,146
Patented Mar. 6, 1956

2,737,146

HEATING ELEMENT CONTROL POSITION INDICATOR FOR ELECTRIC RANGE

Lawrence A. Philipp, Detroit, Mich., assignor to Nash-Kelvinator Corporation, Detroit, Mich., a corporation of Maryland Application October 16, 1951, Serial No. 251,601

1 Claim. (Cl. 116—124)

This invention relates generally to cooking ranges and more particularly to heating element control position indicators therefor.

As is well known, the controls on present day cooking ranges may be set, in addition to "on and off" positions, at selective intermediate positions for conveniently obtaining desired heating element heat intensities. As an aid to the user, it has been a common practice to mark heating element control operating knobs with such markings or indicia as "off," "on," "low," "medium low," "medium," etc. However, these and similar markings are not especially convenient for the reason that the user has to hesitate, more or less, search for, and read the markings; or, in other words, the user is not immediately certain of the position to which to move the knob for any certain heat. In addition, such markings do not readily attract attention, and, as a result, it frequently occurs that heating elements are inadvertently left "on." This is particularly true of electric ranges since the heating elements thereof do not glow at all heat intensities or otherwise particularly attract attention to the fact that they are "on" or energized. Consequently, in addition to the undue expense of forgotten, energized heating elements there is always the danger of an unsuspecting person being burned on what appears to be a cool element.

Accordingly, it is an object of the present invention to provide an improved heating element control indicator for visually attracting attention to and indicating "on," "off," and intermediate positions of heating element controls.

Another object of the invention is to provide for electric cooking ranges, a heating element control indicator of a character to attract attention to the setting of the heating element control so as to lessen the possibility of such elements being inadvertently left in, "on," positions.

Another object of the invention is to provide an improved electric range heating element control indicator which will call attention to energized elements, and also indicate the heat intensity for which the control is set.

Another object of the invention is to provide for obtaining the above results inexpensively by an improved arrangement of a light source and light transmitter, arranged to illuminate heating element heat intensity indicia, and to provide heating element control operating knobs having light transmitting means selectively alignable with the indicia, corresponding to desired heating element heat intensities.

Another object of the invention is to provide an improved heat indicating device for electric range heating elements having an improved arrangement of a light source, indicia, and light reflectors to obtain uniform light intensity at the light reflecting means for all positions of switch operating knobs.

Further objects and advantages of the present invention will be apparent from the following description, reference being had to the accompanying drawings, wherein a preferred form of the invention is clearly shown.

In the drawings:

Fig. 1 is a fragmentary, front view of a cooking range incorporating my improved heating element control setting indicator;

Fig. 2 is a vertical, cross sectional view of the range and one of my heating element control setting indicators, taken along the line 2—2 of Fig. 1;

Fig. 3 is a fragmentary, elevational view of certain parts of my control setting indicator, taken along the line 3—3 of Fig. 2;

Fig. 4 is a fragmentary, elevational view of other parts of the control setting indicator, taken along the line 4—4 of Fig. 2;

Fig. 5 is an elevational view of one of my heating element control knobs, looking in the direction of the arrows 5—5 of Fig. 2;

Fig. 6 is a cross sectional view of parts of the control indicator, taken along the line 6—6 of Fig. 4;

Fig. 7 is a vertical cross sectional view similar to Fig. 2 of a modified heating element indicating system;

Fig. 8 is an elevational view of one side of a light transmitting medium shown removed from the light indicating apparatus of Fig. 7;

Fig. 9 is another elevational view of the light transmitting medium of Fig. 8;

Fig. 10 is a cross sectional view of the light transmitting medium taken along the line 10—10 of Fig. 8; and Fig. 11 is a fragmentary cross sectional view of the light transmitting medium taken along the line 11—11 of Fig. 9.

Referring to the drawings by characters of reference, and first to Figs. 1 to 6 inclusive, the electric cooking range of Fig. 1 has the usual top 20 which is provided with a number of openings to receive respectively so-called electric, surface heating elements 22. The range top 20 is further provided with a rear, upstanding splash guard or flange 24 which may also serve as a mounting for heating element controls or switches 26 for the heating elements. These switches 26 may be mounted on and behind the range top flange 24 for individually and respectively controlling the heating elements 22. Since electric controls or switches for cooking ranges and the manner in which they are electrically connected to heating elements form no part of the present invention and are well known in the art, a detailed showing and description thereof is deemed to be unnecessary.

The switches 26 may be mounted on and secured to a bracket 30 which in turn may be secured to the back of the range flange 24, such as by welding. As shown in Fig. 2, the control supporting bracket 30 is formed so that it is offset, as at 32, in spaced relationship to and rearwardly of the range flange 24 to provide clearance for parts of my hereinafter described switch setting indicator. Each of the controls 26 has an operating member or shaft 34 extending through aligned apertures in the bracket 30 and in the range flange 24 to project forwardly of the flange and receive an operating knob 36 which may be press fitted, keyed, or be otherwise suitably secured to the shaft 34. Preferably, the knobs 36 are arranged in close proximity to the outer surface of the range flange 24 for a purpose hereinafter described.

In accordance with my invention, I provide a switch setting indicator of a character to attract visual attention thereto, indicate the setting of the heating element controls 26, and to readily indicate the position to which to move the knob to obtain a desired heat at the heating element. The switch setting indicators for the heating elements are alike in construction and function and, therefore, a detailed description of one of them is deemed sufficient. Each of the indicators comprises, in general, a light source or electric lamp 40, a light transmitting medium or transparent body or plate 42, color indicia 44, the knob 36, and a light shield 45 or portion of flange 24. The light transmitting plate 42 is disposed behind the range flange 24 between the flange and the switches 26. Pairs of the switches may each be provided with a light transmitting plate, and each plate may be provided with a pair of spaced, clearance apertures respectively to receive the control operating shafts 34. To support the light transmitting plates 42, clip-like retainers 47 may be provided and may be welded or be otherwise secured to the rear of the mounting panel 24. The color indicia 44 is carried by the light transmitting plate 42 on the front face thereof and may engage against the rear surface of the range flange 24, as shown, for example, in Fig. 2. A suitable electric socket 48 is provided for the electric lamp or bulb 40 and may be secured by a bracket 50 to the control mounting bracket 30. In the range flange light shield 45 is provided a plurality of light outlet apertures 52 which are arranged in alignment respectively with the colored indicia 44. Preferably, the light outlet apertures 52 are radially spaced and are located behind the knob 36 for selective alignment with the opening 46 therein. A crystal, jewel shape closure member 54 may be provided for closing the knob aperture 46 and for reflecting the colored light. As previously mentioned, the knob 36 is located close to the range flange shield 45, the purpose of this arrangement being to shield from view all of the apertures 52, except the one which is at the moment aligned with the jewel closed aperture 46 in the knob.

As shown in Figs. 3 and 4, the light transmitting medium or plate 42 is made of a length to extend over and accommodate two adjacent controls; the purpose being to utilize but a single light source for each pair of adjacent control indicators. To this end, the light transmitting plate 42 is provided substantially centrally thereof with an aperture to receive snugly the light bulb 40. Emission of light from the ends of the plate 42 is prevented by covering said ends with sheets of opaque material 60 which may be tin foil imbedded in the panel 42 slightly under the surface thereof. Preferably, the plates 42 are made of a suitable, clear plastic for efficiently transmitting light. To cause the light to be directed onto the colored indicia, I form the plate 42 with conical shape light reflectors 62. These light reflectors 62 are formed in the rear surfaces of the light transmitting plates 42, respectively aligning with the colored disk-like indicia 44. Thus, light from the electric bulb 40 is transmitted by the plate 42 to and is reflected by the conical reflector 62 through the colored indicia 44. The color scale of the indicia 44 may be of any suitable choice of colors. For example, high or maximum heat may be represented by red, and others may have different colors or shades on down the scale to some color, representing low heat. With reference to Figs. 3 and 4, it will be seen that a colored disk is omitted at the top of the light transmitting plate 42 for the reason that when the knob opening 46 is in this position, the control is in, "off," position and the heating element is, of course, de-energized. When the knob 46 is moved to any of the other positions represented, the heating element will be energized accordingly and the intensity of the burner heat in terms of color will be reflected by the jewel 54 of the knob so as to indicate the control setting to the operator and call attention to the fact that the heating element is, "on," or energized.

Referring now to the modification shown by Figs. 7 to 11 inclusive, the numeral 64 designates, in general, an electric range having a rear flange 66 on which a number of surface heating element controls or switches 68 may be mounted. As in the above-described form of my invention, the switches 68 have not been shown or described in detail for the reasons that they are well known in the art and the details thereof form no part of the present invention. The switches 68, of which only one is shown, may be individually secured by brackets 70 to a common mounting plate 72 which may be welded or be otherwise secured to the back of the range flange 66. Sheet metal screws 74 or other suitable securing means may be used to attach the switch brackets 70 to the mounting plate 72. A switch operating member or shaft 76 is shown extending forwardly from the switch casing and beyond the front face of the range flange 66 to receive a hand or finger knob 78 for convenient and easy operation of the switch. In the bracket 70 and mounting plate 72 are respectively provided aligning clearance apertures 80 and 82 to receive the switch operating shaft 76, and in the range flange 66 a large opening 84 is provided through which the shaft extends. Switches of the type of switch 68 have a number of different, "on positions," corresponding to potential heating element heat values ranging from a selected low heat value to a selected high heat value, and in accordance with my invention, I provide an indicating device for visually indicating the setting of the switch by the knob both for convenience and safety. My indicating device comprises in general, a light source or electric lamp 86, a light transmitting medium or transparent body or plate 88, a light shield 90, color indicia 91, and the switch operating knob 78. The electric lamp 86 is located back of the range flange 66 below the switch 68; the light transmitting plate 88 is disposed between the brackets 70 and switch mounting plate 72; and the light shield 90 is disposed between the switch operating knob 78 and the front face of the range flange 66.

A suitable socket 92 is provided for the electric lamp 86 that may be mounted by a bracket 94 on a rearwardly offset flange 96 of the range back flange.

The light transmitting plate 88 is provided with a clearance aperture 98 therethrough to receive the switch operating shaft 76. Also, the plate 88 is provided with spaced clearance apertures 100 to receive the screws 74 which, when tightened down, clamp the plate 88 securely between the opposed side surfaces of the brackets 70 and mounting plate 72.

An inwardly turned lug 102 on the light shield 90 is flanged to receive a screw 104 which holds the light shield to the mounting plate 72. Around its outer periphery, the light shield 90 is provided with a flange 106 which has its edge held snugly against the outer surface of the range flange 66 to prevent emission of light rays from beneath the shield. A large central opening 108 is provided in the light shield 90 to receive a central portion or boss 110 of the knob 78 which may have flattened mating portions to lock the parts for rotation together. An outer marginal portion 112 of the light shield 90 provides a mounting surface for the knob which has a close fit with said surface so as to avoid emission of light rays between the parts.

The knob 78 may be made of a suitable plastic material and be moulded with a recess 114 and with a light opening 116 for emission of light rays from behind the knob. This recess 114 and the opening 116 are disposed radially from the center of rotation of the knob so that, as the knob is rotated to obtain different setting of the switch, the opening is moved to corresponding positions. A clear or substantially colorless crystal 117 is preferably provided to close the light emission opening 116 because it is considered to be more suitable for reflecting colored lights which, as will hereinafter be seen, are emitted from the plate 88 for reflection individually by the crystal. That is, in operation of a switch of the range, different colored lights may be singly aligned with the crystal 117 by rotation of the switch operating knob and with the aid of the colored signal lights, different heat intensities of the heating elements are indicated.

Further in accordance with my invention, I provide a light transmitting medium or plate 88 of a constructive character so as to insure transmission of light from the lamp 86 to any of the possible positions of the adjacent knobs' crystals with equal light intensity or light brightness. To this end, the light transmitting member 88 is made of a transparent material preferably clear phenolic plastic to obtain efficient transmission or piping of light, and in the interests of economy the light transmission medium is preferably in the form of a plate. Also in the interests of economy, the light transmitting medium or plate 88 is made sufficiently large to accommodate two switches or to transmit light from a single electric lamp to two adjacent switch knob crystals 117. Thus, a lamp and a light transmitting plate are provided for each of selected pairs of the switch knobs.

As shown in Figs. 8 and 9, the plate 88 comprises for each of the pair of switch knobs, the plate proper, a plurality of planular light reflectors 120, 122, and 126, a plurality of transverse light reflectors 130, 134, 136, 138, 140, 142, 144, and a plurality of light piping elements 146, 148, 150, 152, 154, 156, and 158. By the term, "planular light reflectors," I mean light reflectors which are arranged so as to reflect light parallel to and between the opposed side surfaces of the light transmitting medium or plate 88, and by the term, "transverse light reflectors," I mean reflectors which are arranged so as to reflect light in a direction transversely to the above-mentioned side surfaces of plate 88.

The plate 88 is provided with an aperture 160 to receive the lamp 86 which positions in the aperture as shown, for example, in Fig. 7. The plate aperture 160 is located below and between the plate apertures 98 for the switch operating shafts 76. Around the lamp receiving aperture 160, the thickness of the plate 88 is preferably increased to pick up more light and also to provide a reinforcing boss 162.

The planular reflectors 120, 122, and 126 are provided by forming flat surfaces on the edge of the plate 88 at determined angles which will reflect light from the lamp 86 onto certain of the transverse light reflectors. The transverse light reflectors are radially spaced about the switch shaft clearance aperture 98 on one side of the plate, and the light piping elements 146, 148, 150, 152, 154, 156, and 158 are similarly radially spaced from the aperture 98 on the other side of the plate. Also, the transverse reflectors and the piping elements are respectively in alignment with each other.

The transverse reflectors are provided by recessing the surface of the plate 88 in such a manner as to form angularly disposed reflecting surfaces, as illustrated in Fig. 11. In the present construction, the reflector surfaces are disposed at an angle of 45 degrees to the plate surface so as to reflect light at right angles to and coaxially of the piping elements. Reflectors 142, 144, and 130 being closer to, and unobstructed by, the other reflectors, are radially disposed with respect to the lamp filament so as to receive light directly therefrom. The other reflectors, namely reflectors 134, 136, 138, and 140, are arranged to receive light from the lamp indirectly by reflection from the planular reflectors 120, 122, and 126. Accordingly, the reflectors 120, 122, and 126 and the transverse reflectors 134, 136, 138, and 140 are respectively angularly disposed so that for each pair the angles of incidence equals the angles of reflection.

The piping elements 146, 148, 150, 152, 154, 156, and 158 extend from the plate surface or side thereof adjacent the knobs to transmit light to points adjacent the crystal light reflectors 117 in the knobs to prevent loss of light intensity. The terminal ends of these piping elements may be flat, and the color indicia may be provided thereon by painting the end of each of the elements with a different color paint to represent different heat intensities of the range heating elements. The other surfaces of the piping elements, namely, the entire edge of the plate 80, and both sides thereof, except the transverse light reflectors, are preferably coated with a suitable paint to prevent loss of light from the medium.

From the foregoing description, it will be understood that I have provided an improved electric range by the arrangement on the range back flange of a heating element heat intensity indicator which indicates the switch setting and attracts attention to the range when the heating element is, "on." Also, it will be noted that I have provided in an electric range, an improved arrangement of lights, color filaments, and light transmitting mediums for attracting attention of the user of the range to indicia on switch operating knobs. Furthermore, I have arranged for transmitting light from a single light source to two adjacent switch setting indicators in the interests of economy of construction and operation. In addition, I have provided an improved light transmitting medium or plate of a structural character to transmit light from a single light source to a switch operating knob reflector at uniform light intensity or light brightness for all positions of the knob.

Although preferred and modified forms have been illustrated, and described in detail, it will be apparent to those skilled in the art that various other modifications may be made therein without departing from the spirit of the invention or from the scope of the appended claim.

I claim:

A light transmitting medium comprising, a light transmitting plate member having a light ray inlet surface on the edge thereof, spaced flat reflector surfaces on the edge of said plate arranged at relatively different angles to reflect light rays inwardly at corresponding angles between the opposite sides of said plate, a plurality of radially spaced reflector surfaces in one side of said plate inwardly of said first reflectors and relatively angularly disposed to receive light rays respectively from said first reflectors and reflect the rays from the other side of said plate, radially spaced indicia on the said other side of said plate arranged to receive light rays respectively from said second reflectors, and means on the surfaces of said plate including the outer surfaces of said flat reflector surfaces to prevent emission of light therefrom.

References Cited in the file of this patent

UNITED STATES PATENTS

| | | |
|---|---|---|
| 2,043,054 | Marty | June 2, 1936 |
| 2,081,827 | Lohe | May 25, 1937 |
| 2,147,944 | Gerrells | Feb. 21, 1939 |
| 2,402,014 | Boeck | June 11, 1946 |
| 2,437,555 | Rees | Mar. 9, 1948 |
| 2,518,726 | Shlenker | Aug. 15, 1950 |
| 2,541,892 | Schulze | Feb. 13, 1951 |
| 2,561,885 | Prideaux | July 24, 1951 |
| 2,566,026 | Hughes | Aug. 28, 1951 |
| 2,612,133 | Crawford | Sept. 30, 1952 |
| 2,648,305 | Appleman | Aug. 11, 1953 |